(12) United States Patent
Loga et al.

(10) Patent No.: US 6,282,951 B1
(45) Date of Patent: Sep. 4, 2001

(54) FLUID FLOW SYSTEM HAVING A STRESS RELIEF CASING

(75) Inventors: Thomas H. Loga, Sugar Land; Jeffery S. Parker, Missouri, both of TX (US)

(73) Assignee: Dresser Industries, Inc., Dallas, TX (US)

( * ) Notice: Subject to any disclaimer, the term of this patent is extended or adjusted under 35 U.S.C. 154(b) by 0 days.

(21) Appl. No.: 09/243,053

(22) Filed: Feb. 2, 1999

Related U.S. Application Data
(60) Provisional application No. 60/073,586, filed on Feb. 3, 1998.

(51) Int. Cl.[7] ............................ G01F 15/14; G01D 21/00; G01D 11/24
(52) U.S. Cl. .................. 73/273; 73/866.5; 73/431
(58) Field of Search .................. 73/273, 866.5, 73/431, 201, 195, 198, 861.32, 861.33

(56) References Cited

U.S. PATENT DOCUMENTS

| | | |
|---|---|---|
| 650,640 | 5/1900 | Fredrick . |
| 2,854,848 | 10/1958 | Hood . |
| 3,067,612 | 12/1962 | Smith . |
| 3,315,694 | 4/1967 | Addison . |
| 3,534,603 | 10/1970 | Hook et al. . |
| 3,692,337 | * 9/1972 | Mischel ................. 285/226 |
| 3,867,840 | * 2/1975 | Baatz ................. 73/861.33 |
| 4,026,585 | * 5/1977 | Berghofer ................. 285/229 |
| 4,598,583 | 7/1986 | Steinhauser . |
| 4,819,482 | 4/1989 | Rappart et al. . |
| 5,058,934 | * 10/1991 | Brannon ................. 285/226 |
| 5,546,801 | * 8/1996 | Swinson et al. ................. 73/273 |

* cited by examiner

*Primary Examiner*—Benjamin R. Fuller
*Assistant Examiner*—Jagdish Patel
(74) *Attorney, Agent, or Firm*—Haynes and Boone, LLP

(57) ABSTRACT

A fluid flow system, casing and method according to which a chamber is formed in the casing and at least one conduit is coupled to the casing so that fluid passes from the conduit and into the chamber and so that forces acting on the conduit creates stresses on the casing that causes flexure of the casing. At least one groove is formed in the wall of the casing defining the chamber, and is configured and located relative to the chamber to direct the flexure away from the wall of the casing defining the chamber.

2 Claims, 1 Drawing Sheet

FLUID FLOW SYSTEM HAVING A STRESS RELIEF CASING

CROSS-REFERENCE TO RELATED APPLICATION

This application is based on provisional application Ser. No. 60/073,586 filed on Feb. 3, 1998.

BACKGROUND

This invention relates to a fluid flow system, casing, and method and, more particularly, to such a system, casing and method designed to be used with a meter for metering flow of the fluid.

Casings are often provided in a fluid flow line for housing a component, such as a flow meter. In these arrangements, the casing is usually placed in the fluid flow path and is provided with a chamber in which the meter, or other component, is installed. Conduits are also connected to the casing by mounting plates and bolts to pass the fluid through the casing. However, the casing is subjected to stresses caused by various bending moments on the conduits, the plates and the bolts. These stresses distort the physical shape of the chamber which often interfere with the operation of the meter, or other component.

Although there have been attempts to combat these stresses by adding material to the outside of the casing in an attempt to strengthen it, this adds to the cost, size and weight of the casing and therefore is undesirable. Therefore, what is need is a casing for housing a component in a fluid flow path that is not affected by the above stresses yet is not relatively high in cost, size and weight.

SUMMARY OF THE INVENTION

Accordingly an embodiment of the present invention is directed to a fluid flow system, casing and method according to which a chamber is formed in the casing and at least one conduit is coupled to the casing so that fluid passes from the conduit and into the chamber and so that forces acting on the conduit creates stresses on the casing that causes flexure of the casing. At least one groove is formed in the wall of the casing defining the chamber, and is configured and located relative to the chamber to direct the flexure away from the wall of the casing defining the chamber.

As a result, the casing not affected by the above stresses yet is relatively inexpensive and is not bulky or heavy.

DETAILED DESCRIPTION OF THE PREFERRED EMBODIMENT

Figure 1:
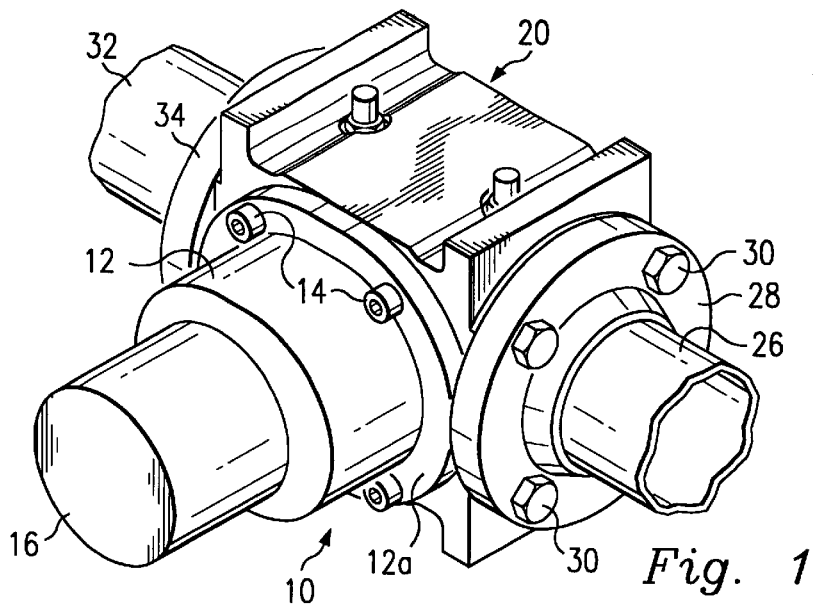
FIG. 1 is a isometric view of a casing according to an embodiment of the present invention shown in connection with a fluid flow meter.

Referring to FIG. 1 of the drawings, the reference numeral 10 refers to a meter for metering the flow of fluid, such as gas, through a fluid flow system. The meter 10 can be of any conventional type such as a positive displacement, rotary type meter, and includes a cover, or housing 12, having an annular flange 12a extending outwardly therefrom that has a plurality of angularly-spaced openings for receiving bolts 14 for reasons to be explained. An accessory unit, in the form of an instrument 16, extends outwardly from the housing 12 and is adapted to provide a visual indication of the amount of fluid that is metered, in a conventional manner. Although not shown in the drawings, it is understood that the meter 10 includes an impeller, or the like that disposed inside the cover 12 that rotates in response to the presence of a pressurized fluid, as will be described.

Figure 2:
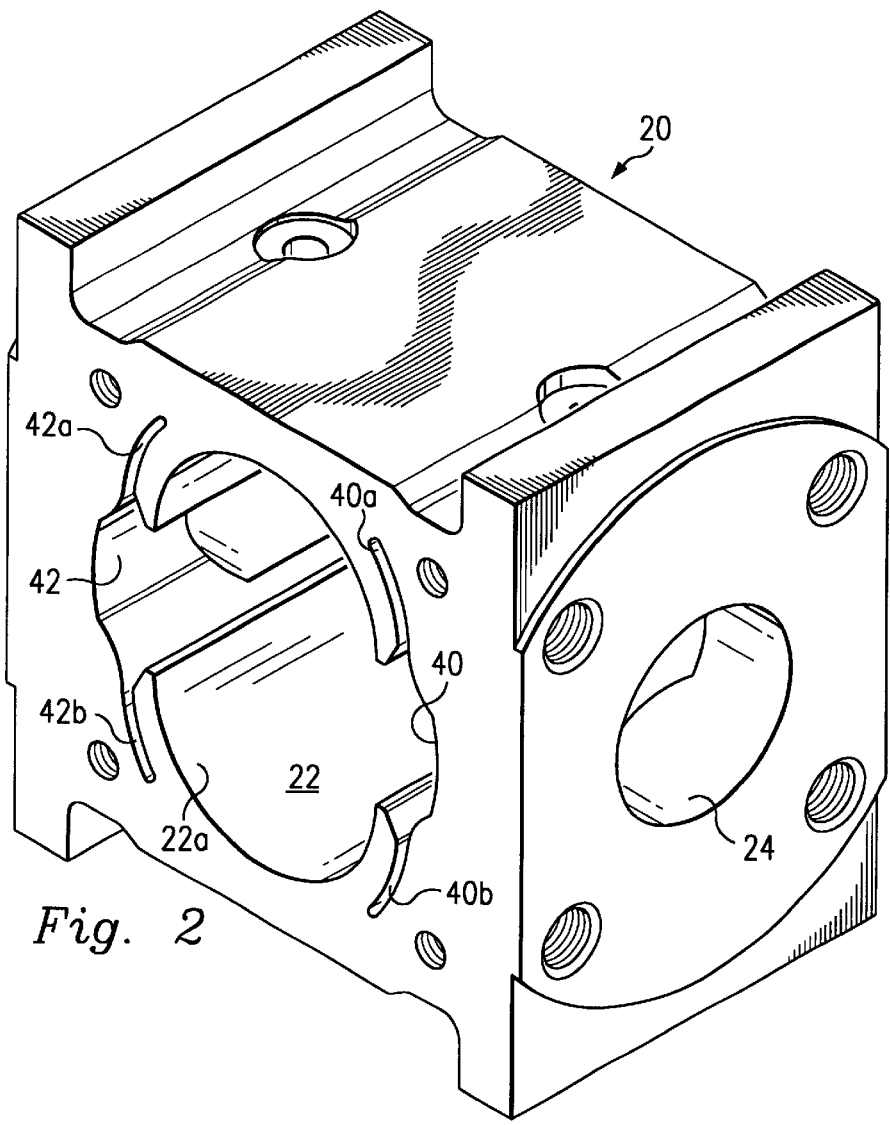
FIG. 2 is an enlarged view of the casing of FIG. 1.

With reference to FIGS. 1 and 2, a casing 20 is provided which is approximately rectangular in cross section and which has an internal measurement chamber 22 (FIG. 2) for receiving the meter 10. As shown in FIG. 1, the meter 10 extends through the chamber 22 with the cover 12 and the instrument 16 protruding outwardly from the casing. Although not shown in the drawings, it is understood the above-mentioned impeller of the meter 10 is centered in the chamber and that another cover protrudes out from the opposite end of the casing 20.

The casing 20 is provided with an outlet port 24 (FIG. 2) that receives an outlet conduit 26 that, in turn, is connected to the casing by an annular mounting plate 28 that receives the conduit. An inlet port (not shown) is provided on the other side of the casing that receives an inlet conduit 32 that, in turn, is connected to the casing by an annular mounting plate 34 that is connected to the latter side wall by another series of bolts (not shown). The axes of the conduits 26 and 32 thus extend perpendicular to the axis of the chamber 22.

The inlet port and the outlet port 24 both extend into the chamber 22 so that the fluid flows from the inlet conduit 32, through the chamber 22, and to the outlet conduit. During the passage of the fluid through the chamber 22, it passes through the above-mentioned impeller of the meter 10 which meters the amount of fluid flow which registers on the instrument 16. With the exception of the specific design of the casing 20 that will be described in detail, all of the above is conventional and therefore will not be described in any further detail.

As discussed above, forces acting on the conduits 26 and 32 and the meter 10 establish moment arms that apply stresses to the casing 20 through the plates 28 and 34, the bolts 30, and the bolts associated with the plate 34. These stresses will cause the structure of the casing 20 to flex and thus distort the precise configuration of the chamber 22. This can cause the impeller of the meter 10 to malfunction due to the flexed wall of the casing 20 defining the chamber 22 actually engaging and interfering with the meter's impeller.

According to a feature of an embodiment of the present invention, the chamber 22 of the casing 20 is configured in a unique manner to isolate the meter from the above stresses. To this end, the cross-sectional shape of the chamber 22 shown is FIG. 2 is generally in the form of an ellipse 22a having a horizontal axis that is slightly less in length than the vertical axis, as viewed in FIG. 2. Two notches 40 and 42 are formed in the wall of the casing defining the chamber 22 and extend for the entire length of the chamber. The notches 40 and 42 are located on the opposite sides, or the relatively long walls, of the chamber as viewed in the drawing. A pair of elongated grooves 40a and 40b are cut into the casing 20 and extend from the opposite ends of the notch 40, and a pair of elongated grooves 42a and 42b are also cut in the casing 20 extend from the opposite ends of the notch 42. The grooves 40a, 40b, 42a, and 42b extend for the entire length of the chamber 22 and generally parallel to portions of the inner wall of the casing 20 defining the corresponding portions of the chamber. The notches 40 and 42 and the grooves 40a, 40b, 42a, and 42b are sized to not reduce the load bearing properties of the casing 20.

Thus, any stresses occurring on the portions of the casing 20 adjacent the the plates 28 and 34 caused by forces acting on the conduits 26 and 32, respectively, as discussed above will cause the latter portions to flex. However, the grooves 40a, 40b, 42a, and 42b are constructed and arranged to direct this flexure away from the wall of the casing 20 defining the chamber 22 and thus isolate, or decouple, the chamber from the structure of the casing that receives the plates 28 and 34. Thus, the physical shape of the chamber 22 is not changed, yet the casing 20 does not require additional material that adds to the cost, size and weight of the casing.

It is understood that variations can be made in the foregoing without departing from the scope of the invention. For example, the shape of the chamber and the grooves can vary within the scope of the invention as long as the above results are achieved. Also, the number of conduits connected to the casing and the number of notches and grooves formed in the casing can vary. Further, the spatial references referred to above, such as "upper", "lower", "side", etc., are for illustration purposes only and are not intended to limit the specific location or orientation of any of the structure. Still further, the casing of the above embodiment is not limited to use with a meter but can be used in connection with other components.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the invention.

What is claimed is:

1. A fluid flow system comprising a casing having an internal wall defining a chamber, a first exterior wall, a second exterior wall extending opposite the first wall, a first opening formed in the first wall and extending from the first wall to the chamber, a second opening formed in the second wall and extending from the second wall to the chamber, the second opening being in alignment with the first opening, a third exterior wall extending at right angles to the first wall and the second wall, and a third opening formed in the third wall and extending from the third wall to the chamber; an inlet conduit registering with the first opening for passing fluid into the chamber; an outlet conduit registering with the second opening for passing the fluid out from the chamber; a meter disposed in the third opening and the chamber for metering the fluid flow through the chamber; a notch formed in each of two opposed wall portions of the casing defining the third opening and extending into the chamber; and two grooves formed in each of the two opposed wall portions of the casing defining the third opening and extending from respective ends of the notch formed in each of the two opposed wall portions and into the chamber, the grooves being spaced from corresponding inner wall portions of the casing defining the third opening and causing flexure of the casing in response to any stresses occurring around the first opening and/or the second opening by forces acting on the inlet conduit and/or the outlet conduit, the grooves directing the flexure away from the internal wall.

2. The fluid flow system of claim 1 wherein the grooves decouple the chamber from the casing.

* * * * *